Feb. 5, 1957   J. FOLK   2,780,258
PUSHER ASSEMBLY FOR SLICING MACHINES
Filed March 19, 1953   2 Sheets-Sheet 1

INVENTOR:
JOSEPH FOLK
BY
Spencer, Johnston, Cook & Root
ATT'YS

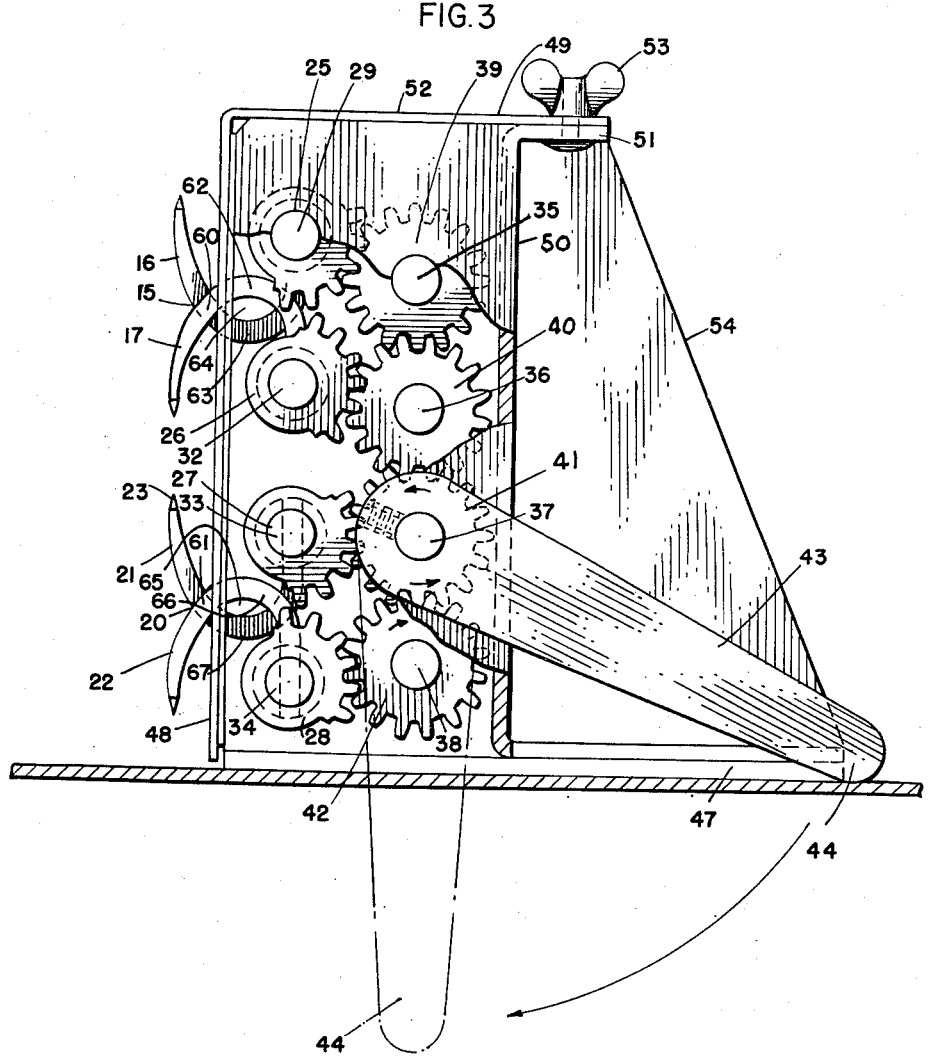

United States Patent Office 2,780,258
Patented Feb. 5, 1957

2,780,258

PUSHER ASSEMBLY FOR SLICING MACHINES

Joseph Folk, La Porte, Ind., assignor to U. S. Slicing Machine Company, Inc., La Porte, Ind., a corporation of Indiana Application March 19, 1953, Serial No. 343,465

4 Claims. (Cl. 146—217)

This invention relates in general to improvements in slicing machines and is directed particularly to an improved machine for automatically securing a meat substance upon the substance support of the machine as the substance to be cut is reduced in size subsequent to slicing operations. The present invention is applicable for use with a substance pusher of a slicing machine wherein a wall exerting pressure upon a substance that is being cut has a series of openings therein that permits the advance of a series of prongs for insertion into the heat substance, thereby to position the substance upon the substance support and to secure it in place thereon, as well as to withdraw the unsliced part of the substance from the knife with the return of the pusher to its initial starting position.

Heretofore there have been no means provided in slicing machines for securing the substance being sliced to the pusher whereby the substance will be withdrawn from the knife at the end of the slicing operation when only a stub of the substance remains. It has been the practice to retract the pusher either manually or automatically and then remove the substance stub by hand. This practice is dangerous to the operator because of the proximity of the operator's hands to the knife. It is also time consuming.

While the slicing machine embodying the present invention may have general application for the purpose of slicing various substances, it is particularly suitable for the slicing of bacon which is a substance having a tough fibrous outer coating that is difficult to handle as a bacon slab becomes stub-like in character. Upon attaining such short length there is danger to the operator should the stub slip or slide as it is advanced into the slicing plane of the knife.

Therefore, it is an object of the present invention to accomplish the foregoing result, thereby eliminating the possibility of danger to the operator handling substances that are in the nature of a stub as the slicing operation is conducted upon the substance.

Another object of the invention is to provide a slicing machine with means to position a short-sized substance that is advanced to a slicing knife as an economy measure eliminating the discard of stubs not capable of subjection to a slicing operation on conventional machines because of the stub-like properties of the substance.

A further object of the invention is to provide a slicing machine with automatic positioning means wherein the positioning of the substance upon the slicing machine substance support occurs as the substance advances toward the slicing plane of the machine.

Another object of the invention is to provide means whereby a meat substance small in size is rigidly positioned upon the substance support of a slicing machine.

A further object of the invention is to provide a means for positioning a substance upon the support of a slicing machine wherein the positioning means grasps the substance as the substance is advanced toward the slicing knife and wherein the substance is released as the mechanism for advancing the substance is returned to its starting point.

Another object of the invention comprises a substance pusher attachment that may be conveniently mounted upon a slicing machine to rigidly position a substance to be sliced as the substance grows smaller in size.

Other objects and advantages of the invention will become apparent upon reading the following description taken in conjunction with the following drawings, in which:

Figure 3 is an enlarged side elevational view, partly in section, of a detail of the positioning means taken along the plane of line 3—3 of Figure 1.

Stated more specifically, the invention consists of a slicing machine having means for positioning and retaining in place substances to be sliced. The machine is equipped with a pusher having a predetermined number and series of openings in the bearing face of the pusher, that is, the face that abuts the end of a substance to be cut such as the end edge of a slab of bacon.

A plurality of arcuate prongs having pointed outer ends are mounted movably to project through the openings in the face of the pusher. Some of the prongs are curved in one direction and some in another. All of the prongs in a single series curving in the same direction are fixed to a shaft, so that as the shaft rotates in one direction the prongs will project and become imbedded in the substance. Rotation of the shaft in the opposite direction will withdraw the prongs on that shaft from the substance. When the pusher is in its retracted or initial position the prongs will be positioned behind the bearing face of the pusher. The shafts on which the prongs are mounted are caused to rotate in the proper directions simultaneously by means of a gear train. Movement of the pusher toward the knife will actuate the gear train and rotate the shafts to project the prongs so that they will become imbedded in the substance being sliced. Continued movement of the substance toward the knife causes the prongs to enter into the substance for their entire length, and the substance then becomes securely positioned by means of the upwardly and downwardly extending prongs imbedded in the substance surface. Such positioning continues until substantially all of the substance is sliced.

Upon return of the pusher the prongs gradually move back into the openings of the pusher bearing wall so that the bearing wall is unimpeded by the prong presence, permitting the abutment of another food substance against the pusher wall and upon the substance support of the machine; thereupon the slicing operation may be resumed and the positioning just described effected as the substance is again moved toward the knife.

Figure 1:
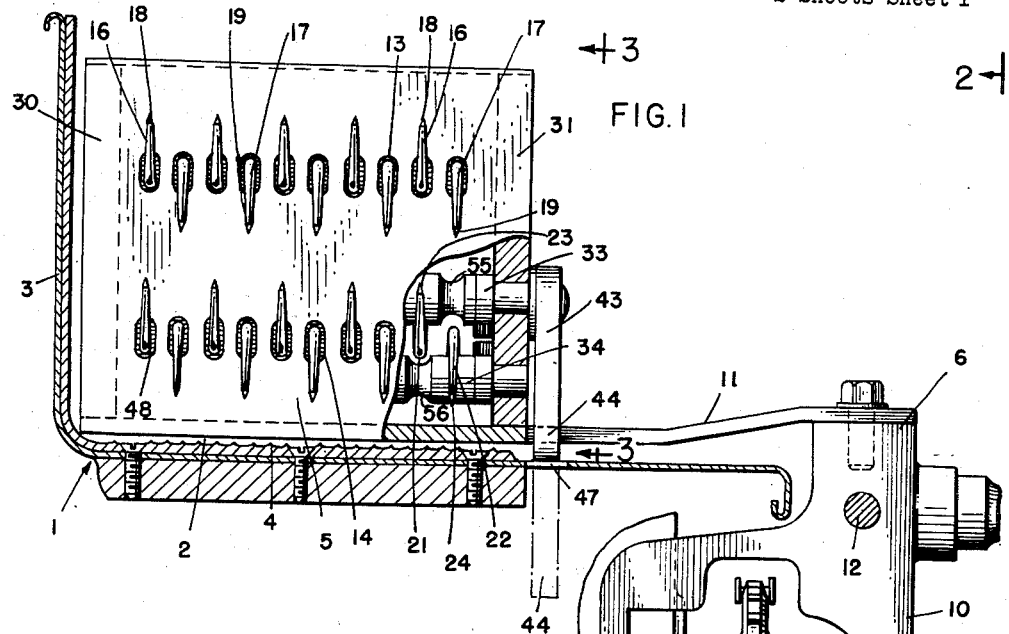
Figure 1 is a front elevational view of the pusher of a slicing machine embodying the present invention.

With respect to Figure 1, the substance support is indicated generally at 1 and has a platform 2 and side wall 3. The platform has a corrugated surface, as indicated at 4, to facilitate positioning of the substance or meat to be cut and to prevent lateral movement thereof. A pusher 5 is located on the platform and may be either manually or automatically advanced to the slicing plane of the knife. As depicted in Figure 1, the pusher is advanced automatically by means of advancement means 6 comprised of a power-driven link belt 7 positioned on a sprocket wheel 8 mounted on a shaft 9. A bracket 10 slidably positions the pusher by means of arm 11 upon guide bar 12.

The pusher 5 has an upper row of spaced-apart openings 13 and a lower row of spaced-apart openings 14. The openings are adapted to receive curved prongs in pairs 15, each pair being comprised of an arcuate upwardly directed prong 16 and an arcuate downwardly directed prong 17 each terminating respectively in a point 18 and 19 at the apex thereof. As depicted in the drawings, there are several such openings in rows 13 and 14 each adapted to receive the prong of a pair of prongs 15.

In describing the function of the prongs 15, reference will be had to a pair of prongs 15 located in the upper row 13 of openings and a lower pair 20 located in the lower row of openings 14. Lower pair of prongs 20 is similarly comprised of an arcuate upwardly extending prong 21 and an arcuate downwardly extending prong 22, each respectively terminating in a sharp point 23 and 24.

The upwardly curved prongs 16 are rigidly secured to shaft 29 journaled for rotation in walls 30 and 31 of pusher 5. The downwardly curved prongs 17 are mounted on shaft 32 also journaled in walls 30 and 31. Likewise, the upwardly curved prongs 21 of the lower series are secured to shaft 33 and downwardly curved prongs 22 are fixed to shaft 34. Shafts 33 and 34 are both journaled for rotation in walls 30 and 31. Gear segments 25, 26, 27 and 28 are mounted respectively on the ends of shafts 29, 32, 33 and 34 as illustrated in Figure 3.

Pusher walls 30 and 31 also have journaled therein for rotation shafts 35, 36, 37 and 38, each having mounted thereon respectively gears 39, 40, 41 and 42. The latter gears are enmeshed to form a gear train which is actuated by a lever or arm 43 rigidly secured to shaft 37.

Figure 2:
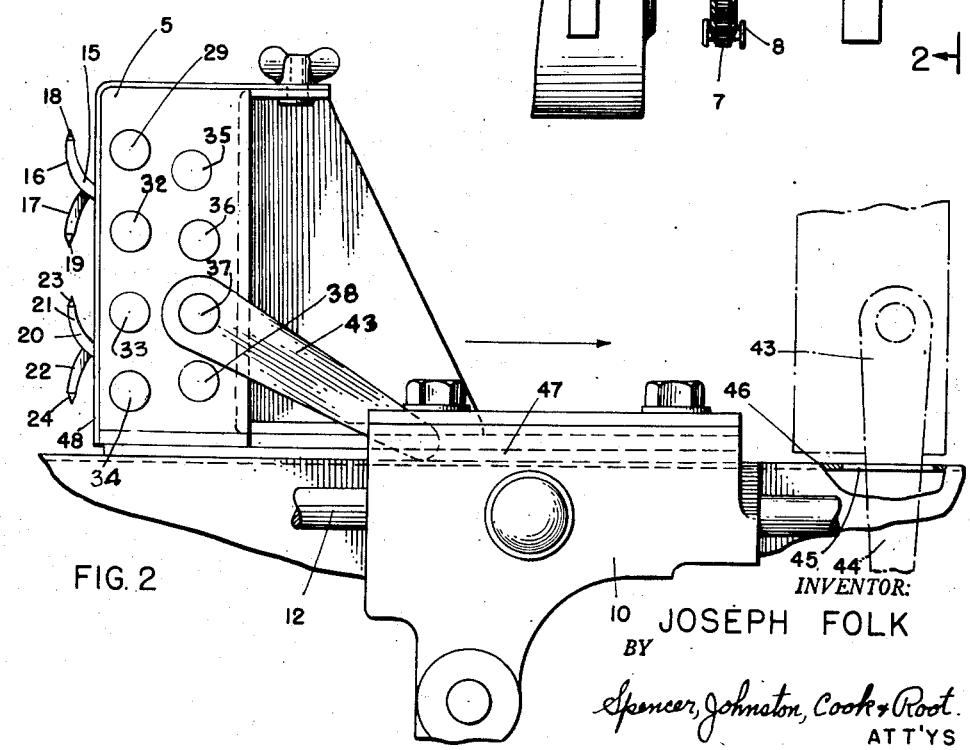
Figure 2 is a side elevational view of the pusher and machine structure upon which the pusher is slidably mounted looking in the direction of the arrows 2—2 of Figure 1.

When a substance of a pre-determined length is placed upon the platform 2 of the machine and is moved toward the slicing plane of the knife by the force of pusher 5 directed against the end of the substance that abuts the pusher, lever 43 lies in a vertical position as depicted by the dotted lines in Figures 2 and 3, and lever end 44 extends through slot 45, Figure 2. As the pusher advances toward the knife along the guide bar 12, lever 43 moves forwardly in the slot 45 until it encounters the forward edge 46 thereof, Figure 2. Lever end 44 is gradually raised to the lever guide surface 47 of the machine. Lever 43, as stated, is secured to shaft 37 and consequently rotates shaft 37 in a counter-clockwise direction as end 44 of the lever is brought to the machine surface 47.

Since gear 41 is mounted on shaft 37 it will also rotate in a counter-clockwise direction. Gear segment 27, being in mesh with gear 41, will thereupon be caused to rotate in a clockwise direction carrying with it shaft 33 and the upwardly curved prongs 21, thereby causing these prongs 21 to become imbedded in the meat substance.

Gear 41, being enmeshed with gears 40 and 42, operation thereof effects a rotation of the latter two gears. The rotation of the gear 40 in a clockwise direction by gear 41 serves to rotate gear 39 in a counter-clockwise direction. Operation of prongs 21 by movement of lever 43 has been explained above. Operation of prongs 16, 17 and 22 occurs in a similar manner. Members 25, 26, 27 and 28, being sector gears, are intermeshed respectively with gears 39, 40, 41 and 42. Rotation of the latter is transmitted to the sector gears whereby the points 18, 19, 23 and 24 of the prongs are rotated and gradually penetrate the substance as the pusher advances toward the slicing knife. The rotation continues until a substantial portion of the prong members becomes imbedded within the substance. The prong members are curved and the concave aspect of the curves of each of the prongs approach each other and cross at a point 60 and 61, Figure 3, immediately adjacent the openings 13 and 14 when the prongs are completely imbedded. The unimbedded portions 62 and 63 of prongs 16 and 17 are curvedly spaced apart to define an opening 64 when viewed on end. A similar opening 65 is formed by the unimbedded portions 66 and 67 of the prongs 21 and 22 when the prongs are end-wise viewed. Upon return of lever 43 to its vertical starting position or position of non-use the gears are rotated in the opposite direction thereby imparting a reverse movement to the gear sector members thus withdrawing the prongs from the substance and to a position within the openings of the wall.

The movement just described generally, occurs as follows: Gear 41 is rotated counter-clockwise by the rotation of shaft 37 secured to lever 43. Gear 41, being enmeshed with gears 40, 42 and gear segment 27, imparts a clockwise movement to the latter three gears. Gear 42 is enmeshed with gear segment 28, whereas gear 40 enmeshes with gear segment 26 and gear 39. The clockwise movement of gears 40 and 42 imparts a counterclockwise movement to gear 39 and gear segments 26 and 28. Gear segments 26 and 28 are secured respectively to shafts 32 and 34 to which the downwardly turned prongs 17 and 22 are mounted. As shown in all of the figures, the prongs are at the imbedded position that occurs after the rotation of gear segments 26 and 28 by gears 40 and 42 respectively as just described. Gear 39 is enmeshed with gear segment 25, and its directional rotation is identical to the rotation of gear 40. Thus, a counter-clockwise movement of gear 41 causes a clockwise rotation of 40 and a counter-clockwise rotation of gear segment 25. The clockwise movement of gear segment 25 causes prong 16 to emerge through the opening 13 and become imbedded in the substance abutting bearing wall 48 of the pusher.

The gear arrangement described is enclosed within the housing 49 having a rear wall 50 terminating in a flange 51 that abuts the top side 52 of the pusher 5 and is secured thereto by means of wingnut 53. A reinforcing web 54 is located along the midpoint of the rear wall 50.

The shafts supporting the gear sector members are grooved at spaced apart points to establish a clearance for the prongs of each pair. Annular grooves 55 and 56 in shafts 33 and 34, shown in Figure 3, permit the unimpeded rotation of prongs 21 and 22 respectively.

As can be seen, the actuation of the gear 41 rigidly secured to shaft 37 to which the lever 43 is also fixed imparts a rotational movement to all of the gears 39, 40 and 42 that are enmeshed. The consequent rotation of gear segments 25 through 28 effects a rotational movement of the prong pairs 15 and 20 and the upwardly and downwardly rotating prong members that comprise the respective pairs. The rotation of the pairs of prongs is dependent upon the advance of the pusher toward the slicing plane of the knife. The imbedment of the prongs in the substance subjected to the slicing operation is relatively gradual since the movement imparted to the gear train defined is dependent upon the movement of the lever 43. Lever 43 is elevated gradually and complete imbedment of the prongs occurs only after the lever arm has reached the surface of the frame upon which the pusher is positioned. The grasping force of the pairs of prongs, however, being relatively gradual is firm. When the prong members are completely imbedded in the substance being sliced, the substance is rigidly positioned upon the substance support of the slicing machine and is secured to the pusher. Being so positioned and secured, meat substances may be sliced for substantially the entire length of the substance, thereby eliminating the necessity for discarding such odd lengths or requiring the operator to handle a short piece manually thereby incurring the risk of contact with the knife of the slicing machine. The prong structure here described and the means for imbedding such prongs within the surface of meat substances, therefore, represents a safety as well as an economy measure.

The pusher arrangement is such that it may conveniently be adapted as an attachment to be mounted upon most slicing machines thereby to gain the advantage of the positioning facilities that have been described.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. In a slicing machine of the type described, in combination, a stationary support, a substance pusher having a plate normal to said support, means energizing said pusher for moving the same over said support, means for grasping the substance carried by said support including a plurality of shafts rotatably supported to the rear of said plate, impaling prongs on some of said shafts extending through holes in the pusher plate and adapted to be withdrawn therefrom, means interconnecting said prong shafts for simultaneous rotation in prong extending and prong retracting directions, a lever on one of said shafts, and said support having a slot therein forming abutments to be engaged by said lever to rotate the lever and its shaft to drive all prong shafts for prong extension and prong retraction as the pusher is moved.

2. In a slicing machine of the type described, in combination, a stationary support, a substance pusher having a plate extending from said support, means for guiding said pusher for movement over said support, means for grasping the end of a substance abutting said plate including a plurality of shafts rotatably supported to the rear of said plate, sets of curved impaling prongs on some of said shafts, each set extending through holes in the pusher plate when its shaft is in one position and being withdrawn when its shaft is in another position, means interconnecting said shafts so that the prong shafts move simultaneously in prong extending or prong retracting direction, a lever on one of said shafts extending downwardly alongside said support surface and holding the prong shafts in prong retracted position when the pusher is retracted, and an abutment at the level of said surface positioned to be engaged by said lever as the pusher is advanced to thus rotate the lever and its shaft to drive all prong shafts for prong extension.

3. The slicing machine as defined in claim 2 in which a second abutment at the same level is positioned to be engaged by said lever when the pusher is retracted to return the lever to prong retracted position.

4 In a slicing machine of the type described, in combination, a stationary support, a substance pusher having a plate substantially normal to said surface, means mounting said pusher for advance or retraction over said support, means for slowly grasping the substance on said support as it is advanced including a plurality of shafts rotatably supported by said pusher, impaling prongs on said shafts for extension through holes in the pusher plate on rotation of their shafts in one direction and retraction on opposite rotation, means interconnecting said shafts for simultaneous rotation in prong extending or prong retraction direction, a lever operatively connected to said shafts extending downwardly through a slot in the support when the pusher is retracted, said slot having end walls positioned to be selectively engaged by said lever as the pusher is advanced or retracted to thus rotate the lever to drive all prong shafts for prong extension on advancement and vice versa.

References Cited in the file of this patent

UNITED STATES PATENTS

| 1,404,821 | Williams | Jan. 31, 1922 |
| 2,004,602 | Folk | June 11, 1935 |

FOREIGN PATENTS

| 370,660 | Great Britain | Apr. 14, 1932 |
| 391,717 | Great Britain | May 4, 1933 |